United States Patent
Kim et al.

(10) Patent No.: US 7,751,356 B2
(45) Date of Patent: Jul. 6, 2010

(54) NOTIFICATION OF CHANNEL DESCRIPTOR TRANSMISSION FOR A MOBILE STATION IN IDLE OR SLEEP MODE IN A WIRELESS ACCESS SYSTEM

(75) Inventors: Beom Joon Kim, Seoul (KR); Ki Seon Ryu, Seoul (KR); Yong Ho Kim, Bucheon-si (KR); Yong Won Kwak, Anyang-si (KR)

(73) Assignee: LG Electronics, Inc., Seoul (KR)

( * ) Notice: Subject to any disclaimer, the term of this patent is extended or adjusted under 35 U.S.C. 154(b) by 909 days.

(21) Appl. No.: 11/317,714

(22) Filed: Dec. 23, 2005

(65) Prior Publication Data

US 2006/0203766 A1 Sep. 14, 2006

(30) Foreign Application Priority Data

Dec. 27, 2004 (KR) .................. 10-2004-0112991

(51) Int. Cl.
G08C 17/00 (2006.01)
(52) U.S. Cl. .................. 370/311; 370/318; 370/328; 455/574; 455/458; 455/515
(58) Field of Classification Search ...... 455/450–452.2, 455/572–574, 343.1–343.6, 522, 69, 458, 455/434, 515; 370/322, 328–329, 311, 318, 370/338
See application file for complete search history.

(56) References Cited

U.S. PATENT DOCUMENTS

| | | | |
|---|---|---|---|
| 5,640,395 A * | 6/1997 | Hamalainen et al. | 370/322 |
| 6,078,568 A * | 6/2000 | Wright et al. | 370/312 |
| 6,643,318 B1 * | 11/2003 | Parsa et al. | 375/141 |
| 7,305,240 B2 * | 12/2007 | Chou et al. | 455/450 |
| 7,505,775 B2 * | 3/2009 | Ryu et al. | 455/458 |
| 7,630,729 B2 * | 12/2009 | Kim et al. | 455/515 |
| 2003/0058820 A1 | 3/2003 | Spencer et al. | |
| 2003/0174674 A1 | 9/2003 | Lee et al. | |
| 2005/0143121 A1 * | 6/2005 | Huh et al. | 455/522 |
| 2005/0159162 A1 * | 7/2005 | Park | 455/450 |
| 2005/0289437 A1 * | 12/2005 | Oh et al. | 714/758 |
| 2006/0014550 A1 * | 1/2006 | Ryu et al. | 455/458 |
| 2006/0029011 A1 * | 2/2006 | Etemad et al. | 370/311 |

(Continued)

FOREIGN PATENT DOCUMENTS

EP 1489863 A2 * 12/2004

*Primary Examiner*—Sharad Rampuria
(74) *Attorney, Agent, or Firm*—Lee, Hong, Degerman, Kang & Waimey

(57) ABSTRACT

A method for controlling an idle mode in a mobile station comprises transmitting an idle mode request to a serving base station to enter the idle mode, and receiving a decode information transmission frame value and a decode information change status from at least one base station. The method also comprises, if the decode information change status indicates a change in the decode information, maintaining the idle mode, and receiving the decode information from the at least one base station when the transmission frame value is reached. The decode information may comprise at least one of downlink channel descriptor (DCD) information, uplink channel descriptor (UCD) information, and forward error correction (FEC) code type information. The transmission frame value may comprise a frame number or a frame offset. The at least one base station may be in a same paging group.

14 Claims, 9 Drawing Sheets

U.S. PATENT DOCUMENTS

2006/0194598 A1 * 8/2006 Kim et al. ................... 455/509
2006/0203766 A1 * 9/2006 Kim et al. ................... 370/328
2009/0034443 A1 * 2/2009 Walker et al. ............... 370/311

* cited by examiner

NOTIFICATION OF CHANNEL DESCRIPTOR TRANSMISSION FOR A MOBILE STATION IN IDLE OR SLEEP MODE IN A WIRELESS ACCESS SYSTEM

CROSS-REFERENCE TO RELATED APPLICATIONS

Pursuant to 35 U.S.C. §119(a), this application claims the benefit of earlier filing date and right of priority to Korean Application No. 2004-112991, filed on Dec. 27, 2004, the contents of which are hereby incorporated by reference herein in their entirety.

FIELD OF THE INVENTION

The present invention relates generally to a wireless access system and, more particularly, to idle or sleep mode in a wireless access system.

BACKGROUND OF THE INVENTION

A mobile station (MS) operating in sleep or idle mode of a wireless access system conventionally acts to confirm that sleep or idle mode may be maintained by continually receiving broadcast messages from a base station (BS), such as a traffic indicating message and a paging advertising message, and decoding the received messages to confirm MS status.

Since the traffic indicating message and the paging advertising message include information related to all nearby mobile stations in sleep or idle mode, the messages may be very long. Thus, the mobile station may consume much power to decode the messages.

For most mobile stations, the time required for transmission/reception of data may be shorter than a standby time for receiving data. Therefore, a mobile station in sleep mode typically receives a traffic indicating message to continue the sleep mode (e.g., Negative Indication). Furthermore, a mobile station in the idle mode typically receives a paging advertising message to continue idle mode (e.g., No Action Required). The sleep mode and idle mode control the mobile station via broadcasting, e.g., the traffic indicating message and the paging advertising message, respectively.

However, when the mobile station in sleep or idle mode unnecessarily decodes a message, power is unnecessarily consumed by the mobile station.

SUMMARY OF THE INVENTION

Accordingly, the present invention is directed to notification of channel descriptor transmission for a mobile station in idle or sleep mode that substantially obviates one or more problems due to limitations and disadvantages of the related art.

An object of the present invention is to provide for transmission of a channel descriptor in a wireless access system, such that information regarding decode necessity of a message transmitted in a broadcast format is transmitted to a mobile station. The channel descriptor information may include a downlink channel descriptor (DCD) or an uplink channel descriptor (UCD), and/or decode information. The mobile station then may perform a decode on a necessary message only. Such operation may provide for reduced power consumption by the mobile station and thereby more efficient communications.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for controlling an idle mode in a mobile station comprises transmitting an idle mode request to a serving base station to enter the idle mode, and receiving a decode information transmission frame value and a decode information change status from at least one base station. The method also comprises, if the decode information change status indicates a change in the decode information, maintaining the idle mode, and receiving the decode information from the at least one base station when the transmission frame value is reached.

The decode information may comprise at least one of downlink channel descriptor (DCD) information and uplink channel descriptor (UCD) information. The decode information may comprise forward error correction (FEC) code type information. The transmission frame value may comprise a frame number. The transmission frame value may comprise a frame offset. The at least one base station may be in a same paging group. The method may further comprise maintaining the idle mode if the decode information change status indicates no change in the decode information.

In another embodiment, a method in a network for controlling an idle mode in a mobile station comprises receiving an idle mode request from a mobile station to enter the idle mode, and transmitting a decode information transmission frame value and a decode information change status to the mobile station. If the decode information change status indicates a change in the decode information, the mobile station maintains the idle mode. The method also comprises transmitting the decode information to the mobile station when the transmission frame value is reached.

The network may comprise at least one base station and a paging controller, the paging controller configured to control paging within base stations of a paging group. The decode information transmission frame value and the decode information change status may be broadcast to the mobile station at each paging interval.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Figure 1:
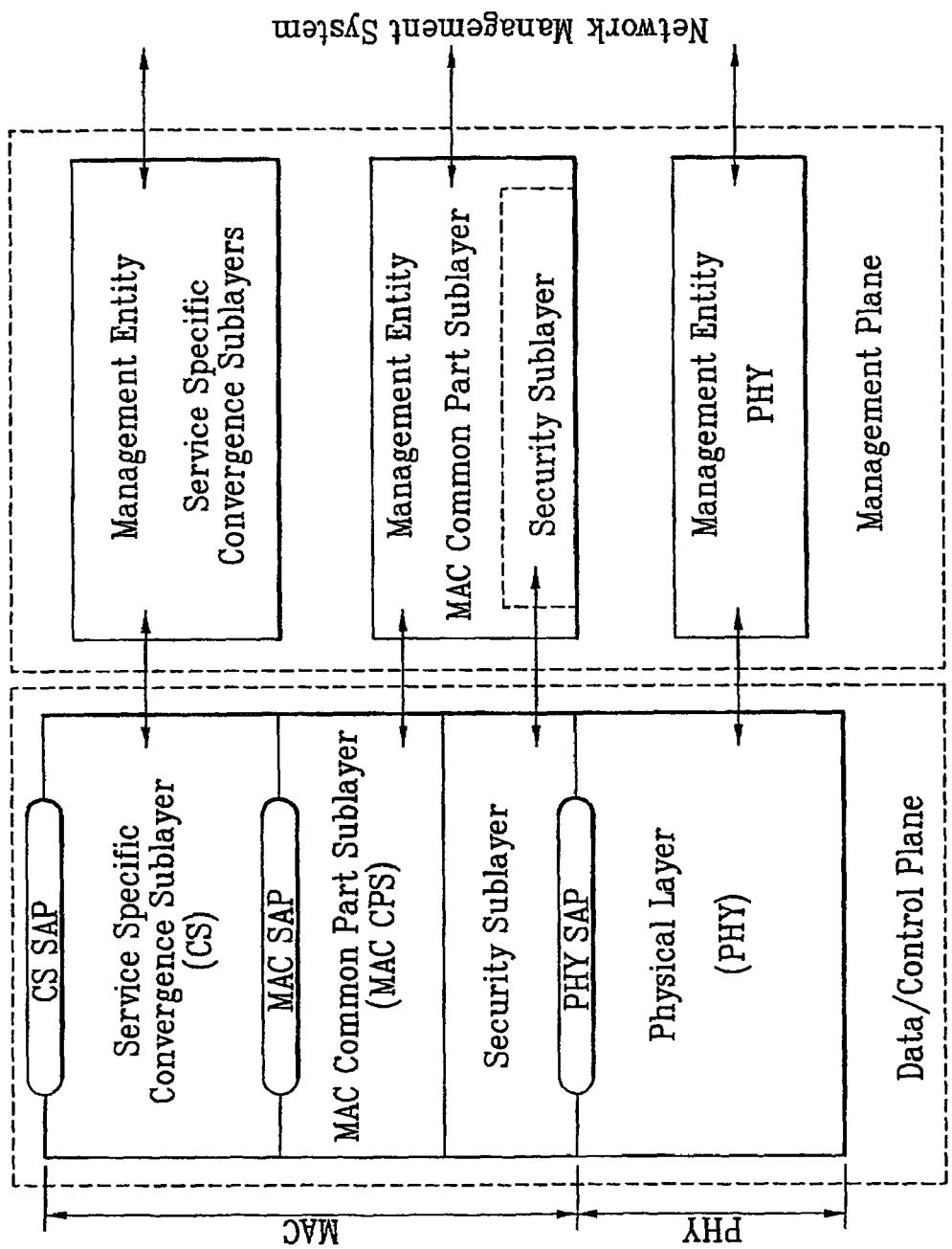
FIG. 1 is a block diagram illustrating protocol layers for use in a wireless access system, according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The present invention may be embodied in a wireless access system operating according to the IEEE 802.16e standard. However, the present invention may also be embodied in wireless access systems operating according to other standards.

The present invention may provide for transmission of a channel descriptor in a wireless access system, such that information regarding decode necessity of a message transmitted in a broadcast format is transmitted to a mobile station. The channel descriptor information may include a downlink channel descriptor (DCD) or an uplink channel descriptor (UCD), and/or decode information. The mobile station then may perform a decode on a necessary message only. Such operation may provide for reduced power consumption by the mobile station and thereby more efficient communications.

Actions of a mobile station in sleep mode include repetition of a listening interval and a sleep interval. The length of the listening interval may be fixed via a sleep request/sleep response message. During the listening interval, the mobile station may confirm whether downlink traffic intended for the mobile station and/or whether to maintain the sleep mode, via a traffic indicating (e.g., MOB_TRF_IND) message transmitted from a base station. The length of the sleep interval may be determined by a sleep window. During the sleep interval, the mobile station receives minimal downlink signals from the base station in order to minimize power consumption.

Actions in sleep mode are performed by sending/receiving management messages, such as a sleep request (e.g., MOB-SLP-REQ) message, a sleep response (e.g., MOB-SLP-RSP) message, and/or a traffic indicating message delivered in a broadcast format between the mobile station and the base station.

Table 1, below, shows an exemplary management message that includes a sleep interval and a listening interval, delivered for a sleep mode request from a mobile station to a serving base station.

TABLE 1

| Syntax | Size | Notes |
|---|---|---|
| SLP-REQ_Message_Format( ){ | | |
| Management message type = 50 | 8 bits | |
| Initial-sleep window | 6 bits | |
| Final-sleep window | 10 bits | |
| Listening interval | 4 bits | |
| Final-sleep window exponent | 3 bits | |
| Reserved | 1 bit | |
| } | | |

Table 2, below, shows an exemplary sleep response (e.g., MOB-SLP-RSP) message to deliver sleep mode associated information including a presence or non-presence of sleep mode approval, a sleep interval, a listening interval, and/or a sleep ID to a mobile station from a serving base station.

TABLE 2

| Syntax | Size | Notes |
|---|---|---|
| MOB-SLP-RSP_Message_Format( ){ | | |
| Management message type = 51 | 8 bits | |
| Sleep-approved | 1 bit | 0: Sleep-mode request denied<br>1: Sleep-mode request approved |
| If(Sleep-approved==0){ | | |
| After-REQ-action | 1 bit | 0: The MS may retransmit the MOB-SLP_REQ message duration (REQ-duration) given by the BS in this message<br>1: The MS shall not retransmit the MOB-SLP-REQ message and shall await the MOB-SLP-RSP message from the BS |
| REQ-duration | 4 bits | The duration for case where After-REQ-action value is 0. |
| reserved | 2 bits | |

TABLE 2-continued

| Syntax | Size | Notes |
|---|---|---|
| } | | |
| Else { | | |
| Start frame | 6 bits | |
| initial-sleep window | 6 bits | |
| final-sleep window | 10 bits | |
| listening interval | 4 bits | |
| final-sleep window exponent | 3 bits | |
| SLPID | 10 bits | |
| } | | |
| } | | |

Table 3, below, shows an exemplary broadcast traffic indicating (e.g., TRF-IND) message delivered at a uniform interval. A mobile station in sleep mode receives a traffic indicating message during a listening interval to decide whether to maintain the sleep mode or to receive downlink data by terminating the sleep mode.

Idle mode supports mobility and increases power efficiency of the mobile station by receiving a periodic paging advertising (e.g., MOB-PAG-ADV) message at the mobile station within a paging zone. The paging zone includes a plurality of base station areas. To configure a paging zone, an inter-base-station message (e.g., Paging-Group-Action) is transmitted between base stations by wire in a format such as that shown in the below Table 4.

TABLE 3

| Syntax | Size | Notes |
|---|---|---|
| MOB-TRF-IND_Message_Format( ){ | | |
| Management message type = 52 | 8 bits | |
| FMT | 1 bit | 0=SLPID based format<br>1=CID based format |
| If(FMT=0) { | | |
| Byte of SLPID bit-map | 8 bits | |
| SLPID bit-map | Variable | Two bits are allocated to one MS<br>00: No periodic ranging opportunity and no PDUs such as DL Traffic<br>10: Periodic Ranging opportunity and no PDUs such as MAC Management message (the MS may return to sleep mode after periodic ranging operation)<br>11: Periodic Ranging opportunity and PDUs such as MAC management messages (the MS shall maintain Awake mode after Periodic Ranging operation) |
| NUM_of_MS_Periodic_Ranging | 8 bits | |
| For(i=0; i<NUM_of_MS_Perio | | |
| Ranging Frame Offset | 10 bits | Frame Offset for case where SLPID bit map indicator is set to '10' or '11' |
| } | | |

TABLE 4

| Field | Size | Notes |
|---|---|---|
| Message Type = ? | 8 bits | |
| Sender BS-ID | 48 bits | Base station unique identifier (Same number as that broadcasted on the DL-MAP message) |
| Target BS-ID | 48 bits | Base station unique identifier (Same number as that broadcasted on the DL-MAP message) |
| Time Stamp | 32 bits | Number of millisecond since midnight GMT (set to 0xffffffff on the DL-MAP message) |
| Action | 4 bits | 0: Assign target BS to paging groups<br>1: Remove target BS from paging groups<br>2: Query (Which paging groups the target BS belongs to?)<br>3: Information (Paging groups the sender BS belongs to) |
| Num Record | 4 bits | Number of paging group-ID records |
| For(j=0; j<Num Record; j++) | | |

TABLE 4-continued

| Field | Size | Notes |
|---|---|---|
| Paging-group-ID | 16 bits | Paging-group-ID |
| PAGING_CYCLE | 16 bits | Cycle in which the paging message is transmitted within the paging group |
| PAGING_OFFSET | 8 bits | MS PAGING OFFSET parameter |
| } | | |
| Security field | TBD | A means to authenticate this message |
| CRC field | 32 bits | IEEE CRC-32 |

The inter-base-station message (e.g., Paging-Group-Action) is delivered between base stations and may be used in various ways according to different combinations of action bits. In a first usage, a receiving base station (target BS) may be assigned to a specific paging group (e.g., Action=0). In a second usage, a receiving base station may be removed from a specific paging group (e.g., Action=1). In a third usage, a receiving base station may be queried regarding to which group the receiving base station belongs (e.g., Action=2). In a fourth usage, a receiving base station may be informed regarding to which paging group a transmitting base station (sender BS) belongs (e.g., Action=3).

Since a base station may belong to one or more paging zones, the inter-base-station message may include information related to a plurality of paging groups. Via the inter-base-station message, base stations may be informed of a paging cycle and a paging offset used in each paging zone. Furthermore, base stations may be dynamically assigned to paging groups using the inter-base-station message.

When entering idle mode, a mobile station uses a deregistration request (e.g., DREG-REQ) message, such as that shown in the below Table 5.

TABLE 5

| Syntax | Size | Notes |
|---|---|---|
| DREG-REQ_Message_Format( ){ | | |
| Management message type = 52 | 8 bits | |
| Deregistration Request Code | 8 bits | 0x00: SS deregistration request from BS and network<br>0x01: Request for MS deregistration from Serving BS invitation of MS paging availability mode<br>0x02-0xff: reserved |
| Paging Cycle Request | 16 bits | Only valid if Deregistration Request Code=0x01 |
| TLV encoded parameter | variable | |
| } | | |

Referring to Table 5, a mobile station sets a deregistration request code of the deregistration request message to 0x01, for example, and then delivers the message to a base station to request entrance to idle mode. The mobile station may accordingly deliver a preferred paging cycle. The base station receives the message and may respond to the request from the mobile station via a deregistration command (e.g., DREG-CMD) message, such as that shown in the below Table 6.

TABLE 6

| Syntax | Size | Notes |
|---|---|---|
| DREG-CMD_Message_Format( ){ | | |
| Management message type = 29 | 8 bits | |
| Action Code | 8 bits | |
| TLV encoded parameters | variable | |
| } | | |

Referring to Table 6, the base station may allow the mobile station to enter the idle mode via Action Code (e.g., Action Code=0x05) of the deregistration command (e.g., DREG-CMD) message. Alternatively, the mobile station may request to enter the idle mode after a prescribed duration (e.g., Action Code=0x06). Alternatively, the mobile station may not request to enter the idle mode until transmitting the deregistration command message (e.g., Action Code=0x07). Exemplary action codes of the deregistration command message are shown in the below Table 7.

TABLE 7

| Action Code | Action |
|---|---|
| 0x00 | SS shall leave the current channel and attempt to access another channel |
| 0x01 | SS shall listen to the current channel but shall not transmit until an RES-CMD message or DREG-CMD with Action Code 0x00 is received. |

TABLE 7-continued

| Action Code | Action |
|---|---|
| 0x02 | SS shall listen to the current channel but only transmit on the Basic, Primary Management and Secondary Management connections. |
| 0x03 | SS shall return to normal operation and may transmit any of its active connections. |
| 0x04 | SS shall terminate current Normal Operation with the BS; the BS shall transmit this action code only in response to any SS DREG-REQ |
| 0x05 | Required MS deregistration from serving BS and request initiation of MS Idle Mode |
| 0x06 | The MS may retransmit the DREG-REQ message after the time duration (REQ-duration) given by |
| 0x07 | The MS shall not retransmit the DREG-REQ message and shall wait the DREG-CMD message |
| 0x08-0xFF | Reserved |

A paging group ID (e.g., Paging Group ID), a paging cycle (e.g., Paging_Cycle) and a paging offset value (e.g., Paging_Offset), which should be maintained during the idle mode by the mobile station, may be delivered via a TLV (type length value) item that may be selectively included in the deregistration message.

The mobile station may then receive a paging advertising (e.g., MOB-PAG-ADV) message, such as that shown in the below Table 8 during a predefined paging cycle and paging offset to maintain or terminate the idle mode.

TABLE 8

| Syntax | Size | Notes |
|---|---|---|
| MOB-PAG-ADV_Message_Format( ){ | | |
| Management message type = ?? | 8 bits | |
| Num_Paging Group IDs | 8 bits | Number of Paging Group Ids in this message |
| For(i=0; i<Num_Paging_Group_IDs; i++){ | | |
| Paging Group ID | 8 bits | |
| } | | |
| For(j=0; j<Num_MACs; j++){ | | Number of MS MAC Addresses in message may be determined from the length of the message (found in the generic) |
| MS MAC address hash | 24 bits | |
| Action Code | 2 bits | |
| Reserved | 6 bits | |
| } | | |
| } | | |

A wireless access system may define a protocol of a medium access control (MAC) layer and a physical (PHY) layer for a point-to-multipoint connection between a base station and a mobile station.

FIG. 1 is a block diagram illustrating protocol layers for use in a wireless access system, according to an embodiment of the present invention.

Referring to FIG. 1, an uppermost part of a MAC layer is a service specific convergence sublayer, operative to convert various packet data of an upper core network to a common protocol data unit (PDU) format according to the MAC specification and to compress a header of the corresponding packet.

A physical layer of the wireless access system may be classified into a single carrier system and a multi-carrier system (e.g., OFDM/OFDMA). The multi-carrier system may use orthogonal frequency division multiplexing (OFDM), capable of allocating resources by subchannel unit grouping. OFDM, in turn, enables orthogonal frequency division multiple access (OFDMA).

Table 9, below, shows common physical layer characteristics between OFDM and OFDMA.

TABLE 9

| Common element | Characteristic |
|---|---|
| Duplexing | Non-authorized band    TDD |
| | Authorized band    TDD, FDD, H-FDD |
| Transport stream | Burst mode |
| | Continuous mode |
| Forward Error Correction Coding | Concatenated coding: RS-code + Convolution code Block Turbo Code (option) |
| Constellation Mapping | BPSK, QPSK, 16QAM, 64QAM, (256QAM) |
| Channel Quality Measurement | Received Signal Strength Indication (RSSI) Carrier to Interface and Noise Ratio (CINR) Uncoded BER |
| Length of Frame | Length of downlink frame is notified by an initiation preamble of a periodically repeated frame. |

Referring to Table 9, forward error correction (FEC) coding selectively uses a concatenated code between a Reed-Solomon code (RS code) and a convolutional code or a block turbo code (BTC) and employs a modulation system of BPSK/QPSK/16-QAM/64-QAM. FEC coding adopts adaptive modulation/coding (AMC) to select a modulation mode and a coding rate method according to a channel status. For AMC, a received signal strength indication (RSSI), a carrier to interface noise ratio (CINR) and/or a bit error rate (BER) are used in measuring channel quality.

In an OFDMA physical layer, active carriers are separated into groups and are transmitted per group to a receiving end. The carrier group transmitted to a particular receiving end is called a subchannel.

Figure 2:
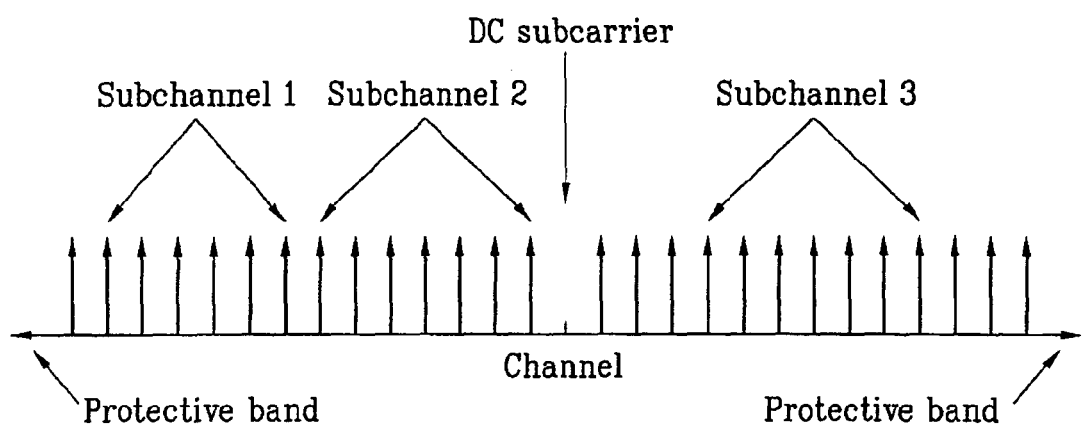
FIG. 2 is a diagram illustrating a subchannel of an OFDMA physical layer, according to an embodiment of the present invention.

FIG. 2 is a diagram illustrating a subchannel of an OFDMA physical layer, according to an embodiment of the present invention.

Referring to FIG. 2, three exemplary subchannels including subcarriers are shown. The subcarriers configuring each of the subchannels may lie adjacent to each other or may be spaced apart from each other at an equal distance. Thus, by enabling multiple access by subchannel unit, complexity of implementation may increase, but frequency diversity gain, gain according to power concentration, and forward power control may be efficiently performed. A slot allocated to each user is defined by a data region of a two-dimensional space. The two-dimensional space is a set of continuous subchannels allocated by a burst.

Figure 3:
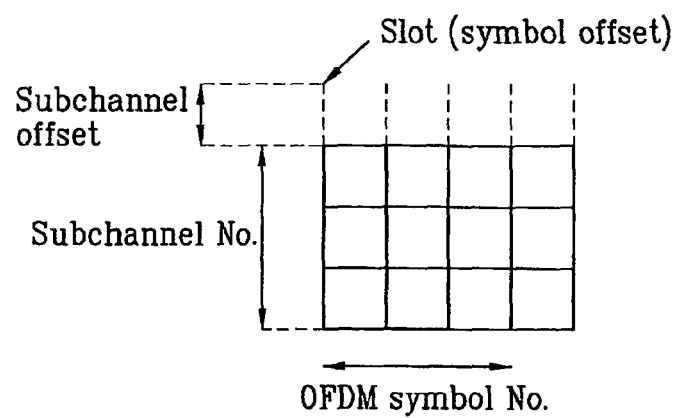
FIG. 3 is a diagram illustrating a data region of an OFDMA physical layer, according to an embodiment of the present invention.

FIG. 3 is a diagram illustrating a data region of an OFDMA physical layer, according to an embodiment of the present invention.

Referring to FIG. 3, a data region of OFDMA may be represented by a rectangle defined by a time coordinate and a subchannel coordinate.

Figure 4:
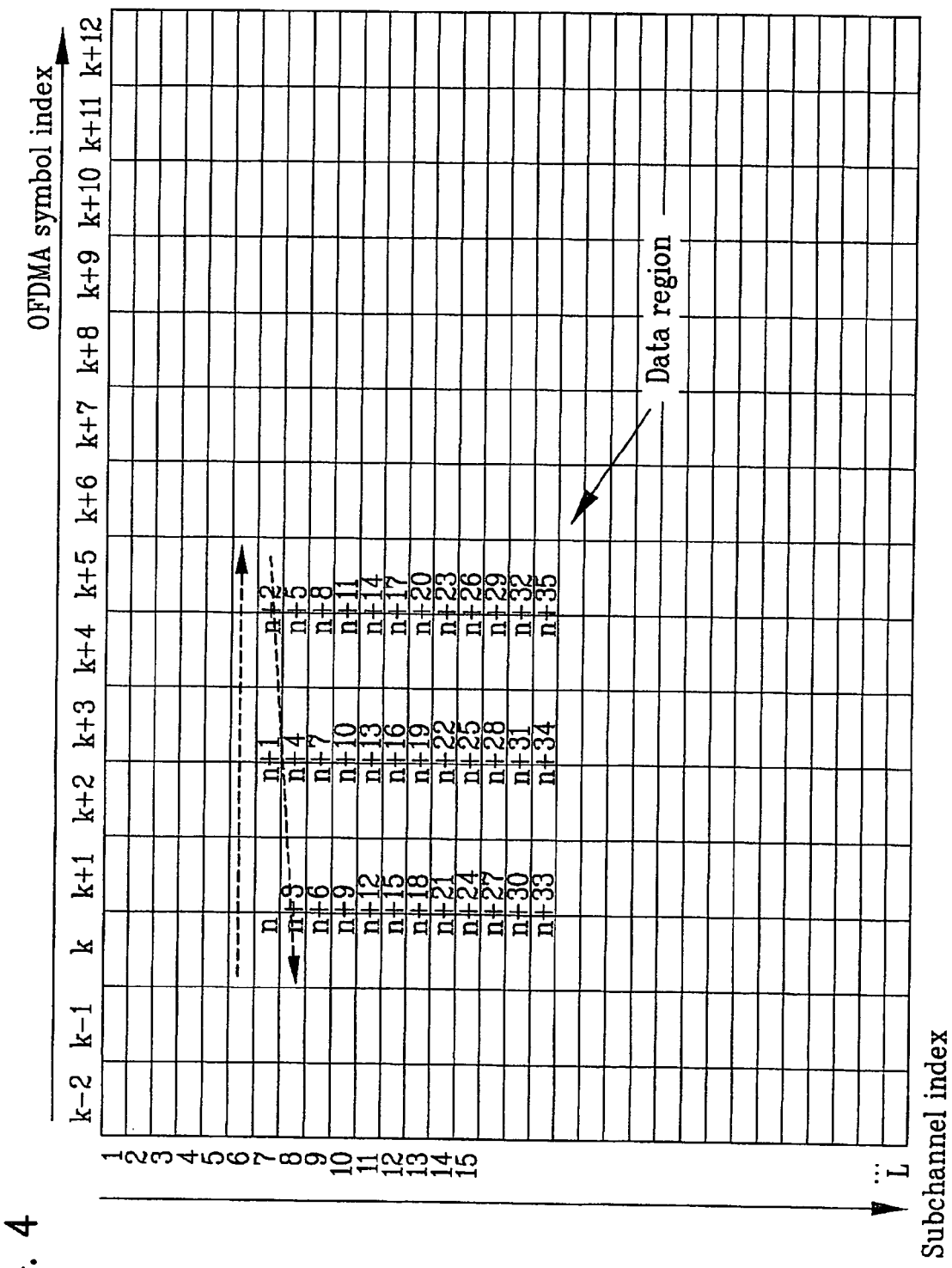
FIG. 4 is a diagram illustrating mapping of an FEC block to an OFDMA subchannel and an OFDM symbol, according to an embodiment of the present invention.

FIG. 4 is a diagram illustrating mapping of an FEC block to an OFDMA subchannel and an OFDM symbol, according to an embodiment of the present invention.

Referring to FIG. 4, the data region is assigned to an uplink of a specific user. Alternatively, a base station may transmit the data region to the specific user. To define such a data region in a two-dimensional space, the number of OFDM symbols in a time domain and the number of continuous subchannels beginning from a remote location reference point with an offset in a frequency domain may be provided.

MAC data is segmented according to a FEC block size and each FEC block is extended to occupy three OFDM symbols on a time axis. Mapping may be sequentially performed by increasing the subchannel number for each FEC block to arrive at the end of the data region. Upon reaching the end of the data region, the mapping continues to be performed from an OFDM symbol with a one-step lower number.

Figure 5:
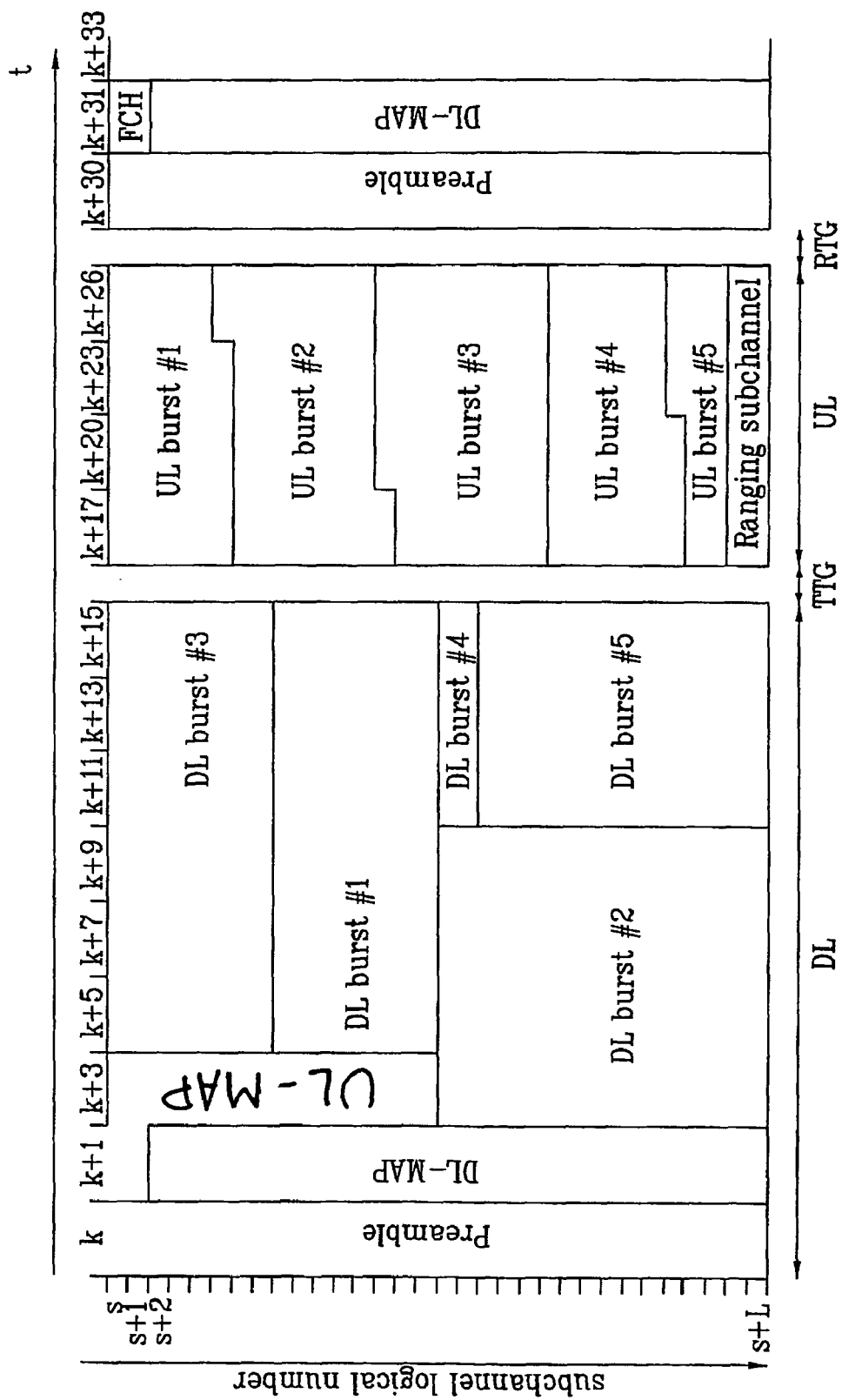
FIG. 5 is a diagram illustrating a frame structure of an OFDMA physical layer in a wireless access system, according to an embodiment of the present invention.

FIG. 5 is a diagram illustrating a frame structure of an OFDMA physical layer in a wireless access system, according to an embodiment of the present invention.

Referring to FIG. 5, a downlink subframe starts with a preamble used in synchronization and equalization of a physical layer and then defines a structure of an overall frame via broadcast downlink map (e.g., DL-MAP) and uplink map (e.g., UL-MAP) messages that define locations and usages of bursts assigned to a downlink and an uplink, respectively.

Table 10 and Table 11, below, show exemplary of DL-MAP and UL-MAP messages, respectively.

TABLE 10

| Syntax | Size | Notes |
| --- | --- | --- |
| DL-MAP__Message__Format( ){ | | |
| Management message type = 2 | 8 bits | |
| PHY Synchronization Field | variable | See appropriate PHY specification |
| DCD Count | 8 bits | |
| Base Station ID | 48 bits | |
| Begin PHY Specific Section { | | See applicable PHY section |
| For(i=1; i<=n; i++){ | | For each DL-MAP element 1 to n |
| DL-MAP__IE( ) | variable | See corresponding PHY specification |
| } | | |
| } | | |

TABLE 10-continued

| Syntax | Size | Notes |
| --- | --- | --- |
| If!(byte boundary){ | | |
| Padding Nibble | 4 bits | Padding to reach byte boundary |
| } | | |
| } | | |

TABLE 11

| Syntax | Size | Notes |
| --- | --- | --- |
| UL-MAP__Message__Format( ){ | | |
| Management message type = 3 | 8 bits | |
| Uplink Channel ID | 8 bits | |
| UCD Count | 8 bits | |
| Allocation Start Time | 32 bits | |
| Begin PHY Specific Section { | | See applicable PHY section |
| For(i=1; i<=n; i++){ | | For each UL-MAP element 1 to n |
| UL-MAP__IE( ) | variable | See corresponding PHY specification |
| } | | |
| } | | |
| If!(byte boundary){ | | |
| Padding Nibble | | |
| } | | |
| } | | |

A DL-MAP message defines a usage assigned to each burst for a downlink section in a burst mode physical layer, and a UL-MAP message defines a usage of a burst assigned to an uplink section.

Table 12, below, shows an exemplary DL-MAP information element (e.g., DL-MAP IE).

TABLE 12

| Syntax | Size | Notes |
| --- | --- | --- |
| DL-MAP__IE( ){ | | |
| DIUC | 4 bits | |
| If(DIUC==15){ | | |
| Extended DIUC dependent IE | variable | |
| } else { | | |
| If(INC__CID==1){ | | The DL-MAP starts with INC__CID = 0. INC__CID is toggled between 0 and 1 by the CID-SWITCH__IE( ) |
| N__CID | 8 bits | Number of CIDs assigned for this IE |
| For(n=0; n<N__CID; n++){ | | |
| CID | 16 bits | |
| } | | |
| } | | |
| OFDMA Symbol offset | 8 bits | |
| Subchannel offset | 6 bits | |
| Boosting | 3 bits | 000: normal (not boosted) |
| | | 001: +6 dB |
| | | 010: −6 dB |
| | | 011: +9 dB |
| | | 100: +3 dB |
| | | 101: −3 dB |
| | | 110: −9 dB |
| | | 111: −12 dB |
| No.OFDMA Symbols | 7 bits | |
| No.Subchannels | 6 bits | |

TABLE 12-continued

| Syntax | Size | Notes |
| --- | --- | --- |
| Repetition Coding Indication | 2 bits | 0b00: No repetition coding<br>0b01: Repetition coding of 2 used<br>0b10: Repetition coding of 4 used<br>0b11: Repetition coding of 6 used |
| } | | |
| } | | |

In the information elements (IE) for configuring a DL-MAP message shown in Table 12, a downlink traffic section is divided at a user end by a downlink interval usage code (e.g., DIUC), a connection ID (e.g., CID), and burst location information (e.g., subchannel offset, symbol offset, subchannel number, symbol number).

Furthermore, in the information elements for configuring a UL-MAP message shown in Table 13, a usage is decided for each CID by UIUC and a location of a corresponding section is specified by a certain duration. In such case, a per-section usage is determined according to a UIDC value used in the UL-MAP. Each section begins from a point remote from a previous IE start point according to a duration specified by the UL-MAP IE.

TABLE 13

| Syntax | Size | Notes |
| --- | --- | --- |
| UL-MAP_IE( ){ | | |
| CID | 16 bits | |
| UIUC | 4 bits | |
| If(UIUC==12){ | | |
| OFDMA Symbol offset | 8 bits | |
| Subchannel offset | 7 bits | |
| No.OFDMA Symbols | 7 bits | |
| No.Subchannels | 7 bits | |
| Ranging Method | 2 bits | 0b00: Initial Ranging over two symbols<br>0b01: Initial Ranging over four symbols<br>0b10: BS Request/Periodic Ranging over one symbol<br>0b11: BW Request/Periodic Ranging over three symbols |
| Reserved | 1 bit | Shall be set to zero |
| } else if(UIUC==14) | | |
| CDMA_Allocation_IE( ) | 32 bits | |
| Else if(UIUC==15){ | | |
| Extended UIUC dependent IE | variable | |
| } else { | | |
| Duration | 10 bits | In OFDMA slots |
| Repetition coding indication | 2 bits | 0b00: No repetition coding<br>0b01: Repetition coding of 2 used<br>0b10: Repetition coding of 4 used<br>0b11: Repetition coding of 6 used |
| } | | |
| Padding nibble, if needed | 4 bits | Completing to nearest byte, shall be set to 0 |
| } | | |

A downlink channel descriptor (e.g., DCD) message includes a modulation type and an FEC code type as physical layer associated parameters to be applied to a burst section assigned to a downlink. An uplink channel descriptor (e.g., UCD) message includes a modulation type and an FEC code type as physical layer associated parameters to be applied to a burst section assigned to an uplink. Moreover, parameters (e.g., 'K', 'R' etc. for R-S code) needed for various forward error correction (FEC) code types are specified. Such parameters are provided by a burst profile specified per UIUC (uplink interval usage code) or DIUC (downlink interval usage code) within UCD or DCD.

Table 14 and Table 15 show examples of DCD and UCD, respectively.

TABLE 14

| Syntax | Size | Notes |
| --- | --- | --- |
| DCD_Manage_Format( ){ | | |
| Management message type = 1 | 8 bits | |
| Downlink Channel ID | 8 bits | |
| Configuration Change Count | 8 bits | |

TABLE 14-continued

| Syntax | Size | Notes |
| --- | --- | --- |
| TLV Encoded information for the overall channel | variable | TLV specific |
| Begin PHY Specification Section{ | | |
| For(I=1; i<=n; i++){ | | For each downlink burst profile 1 to n |

TABLE 14-continued

| Syntax | Size | Notes |
|---|---|---|
| Downlink_Burst_Profile<br>}<br>}<br>} | | PHY specific |

TABLE 15

| Syntax | Size | Notes |
|---|---|---|
| UCD_Manage_Format( ){ | | |
| Management message type = 0 | 8 bits | |
| Configuration Change Count | 8 bits | |
| Ranging Backoff Start | 8 bits | |
| Ranging Backoff End | | |
| Ranging Backoff Start | | |
| Ranging Backoff End | | |
| TLV Encoded information for the overall channel | variable | TLV specific |
| Begin PHY Specification Section{ | | |
| For(I=1; i<=n; i++){ | | For each uplink burst profile 1 to n |
| Uplink_Burst_Profile<br>}<br>}<br>} | | PHY specific |

Each of the DCD and UCD messages are not transmitted each frame but is periodically transmitted at a cycle of maximum 10 seconds. Values of Configuration Change Count included in the DCD and UCD messages are equal to the count values included in the DL-MAP and UL-MAP shown in the above Table 10 and Table 11, respectively. Thus, a mobile station may recognize whether the configurations are changed via the Configuration Change Count values included in the DL-MAP and the UL-MAP, respectively. If the Configuration Change Count value included in the DL-MAP or the UL-MAP is changed, the mobile station receives the DCD or UCD message.

A MAC layer of a wireless access system is described below. A CS (service-specific convergence sublayer) is a layer existing on a MAC CPS (common part sublayer). The CS performs PDU reception from an upper layer, classification of upper layer PDU, handling of the upper layer PDU based on the classification, delivery of a CS PDU to an appropriate MAC SAP, and reception of the CS PDU from a peer entity. The CS is operative in classifying the upper layer PDU per connection, compressing information of a payload header optionally and/or restoring the compressed header information.

The MAC CPS maps each packet to a suitable service flow in packet transmission between a mobile station and a base station on a connection basis and offers a quality of service (QoS) that varies according to the service flow on the connection basis. A MAC PDU format defined in the MAC CPS is described below.

Figure 6A:
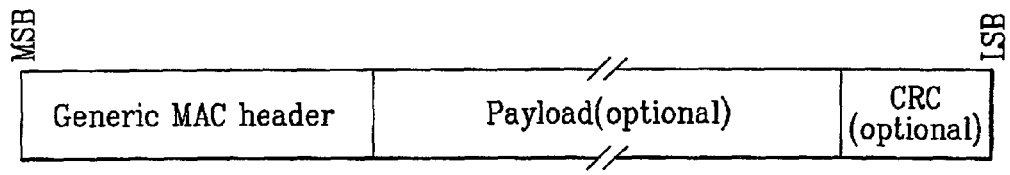
FIG. 6A is a diagram illustrating a MAC PDU format, according to an embodiment of the present invention.
Figure 6B:
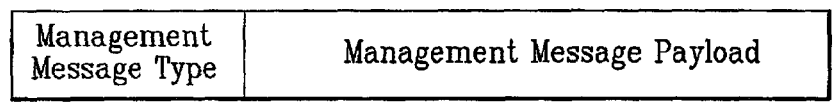
FIG. 6B is a diagram illustrating a MAC management message format, according to an embodiment of the present invention.

FIG. 6A is a diagram illustrating a MAC PDU format, according to an embodiment of the present invention. FIG. 6B is a diagram illustrating a MAC management message format, according to an embodiment of the present invention.

Referring to FIGS. 6A and 6B, MAC PDUs may be classified into a MAC management PDU and a user data MAC PDU. The MAC management PDU uses a MAC management message, which is previously specified for an action of a MAC layer, as a payload. A MAC header is attached to a front end of each payload. A band request PDU, which is needed to dynamically request a band necessary for each subscriber adding uplink, corresponds to a specifically formatted MAC management PDU having only a header called a band request header without a separate payload. A packet PDU corresponding to user data is mapped to a payload of a MAC SDU. The packet PDU becomes the MAC PDU by attachment of the MAC header and CRC.

Figure 6C:
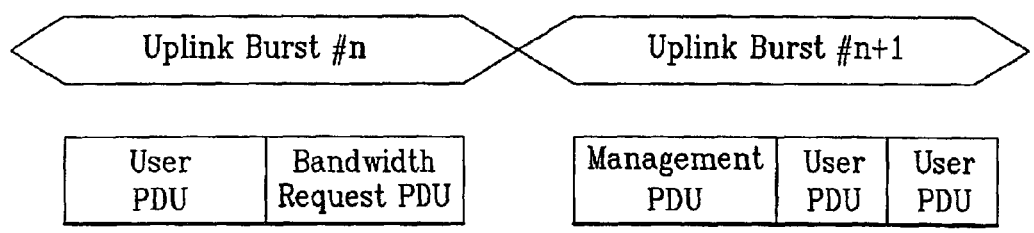
FIG. 6C is a diagram illustrating a plurality of concatenated MAC PDUs for transmission as an uplink burst, according to an embodiment of the present invention.

FIG. 6C is a diagram illustrating a plurality of concatenated MAC PDUs for transmission as an uplink burst, according to an embodiment of the present invention.

Referring to FIG. 6C, each MAC PDU is identified by a unique connection identifier (CID). A MAC management message, a band request PDU, and/or user data (user PDU) may be concatenated to the same burst.

The MAC management message includes a field to indicate a management message type and a management message payload. Among management messages, DCD, UCD, UL-MAP, and DL-MAP correspond to the representative management messages that directly specify the frame structure, the band assignment and the physical layer parameters.

Figure 7:
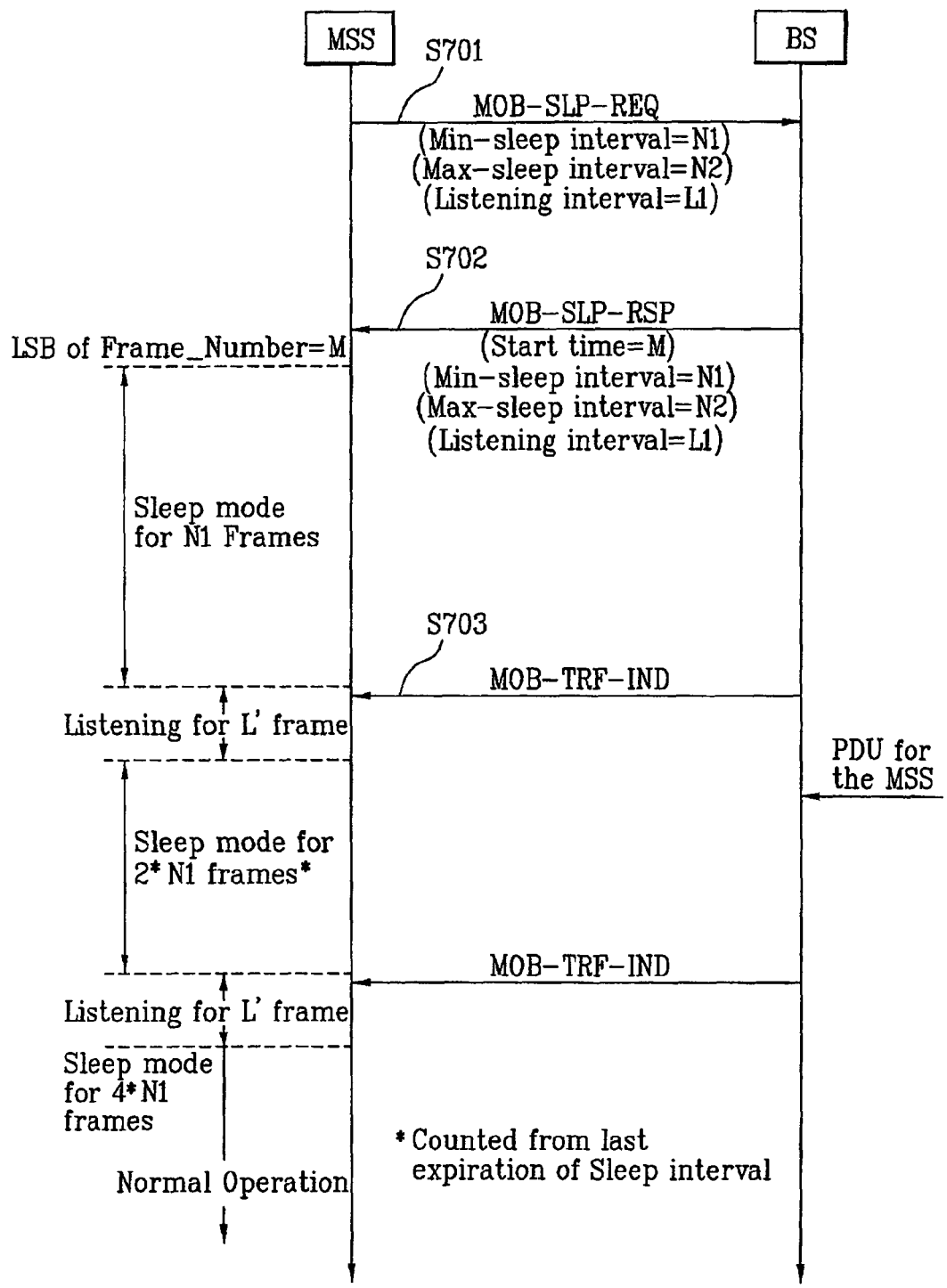
FIG. 7 is a signal flow diagram illustrating idle mode action in a mobile station, according to an embodiment of the present invention.

FIG. 7 is a signal flow diagram illustrating idle mode action in a mobile station, according to an embodiment of the present invention.

Referring to FIG. 7, a mobile station requests a base station for transition to sleep mode, maintains the sleep mode, and then terminates the sleep mode when downlink traffic intended for the mobile station is present, as further described below.

A mobile station sets a sleep request message to values of an initial sleep interval, a final sleep interval, and a listening interval and then delivers the set message to a base station to request a transition to sleep mode (S701). In a case where the sleep mode transition is approved, the base station delivers a sleep response message (S702) set to the initial sleep interval, the final sleep interval, the listening interval, and a sleep mode transition start time (start time offset).

When the sleep mode transition start time occurs, the mobile station receives and decodes all frames during the listening interval. When the initial sleep interval expires, the mobile station receives a traffic indicating message (S703) from the base station for the listening interval. If there is no downlink traffic intended for the mobile station, the mobile station maintains the sleep mode for a period twice the length of the initial sleep interval, for example.

Under the above condition (e.g., a next sleep interval set twice as long as a previous sleep interval), the sleep interval continues to increase. After the final sleep interval set by the sleep response message ends, the final sleep interval is repeated as a next sleep interval. The final sleep interval may be determined by the below Formula 1 via parameters of the sleep response message.

$$\text{final sleep window} = \text{final sleep window base} * 2^{\text{final window exponent}} \quad [\text{Formula 1}]$$

In a case where downlink traffic intended for the mobile station is present, as indicated via a traffic indicating message, the mobile station terminates the sleep mode and receives the downlink traffic in normal mode.

Actions of the idle mode are described below.

A paging zone is defined as an overall area covered by base stations included in a set (e.g., a paging group). The base stations belonging to the same paging group have the same paging cycle (e.g., Paging_Cycle) and the same paging offset (e.g., Paging_Offset).

A mobile station may request a base station for transition to idle mode. The base station then delivers a paging group ID (e.g., Paging Group ID), a paging cycle according to the paging group ID, and a paging offset according to the paging group ID to the mobile station to enable entry to idle mode. During idle mode, the mobile station may determine whether to maintain idle mode or terminate idle mode via a broadcast paging advertising message delivered from the base station at each paging cycle.

In a case where uplink traffic is present for the mobile station in idle mode to transmit, the mobile station may terminate the idle mode. In a case where downlink traffic intended for the mobile station in idle mode is present, the base station may instruct the mobile station to terminate idle mode via the paging advertising message. In a case where the paging advertising message is not received by the mobile station at a certain time (for example, if the mobile station in idle mode moves to another paging zone or loses synchronization to the base station), the mobile station terminates the idle mode.

To minimize power consumption, a method for early notification of the validity of the traffic indicating message and paging messages periodically delivered to the mobile stations in sleep or idle mode, is provided. Accordingly, early notification information having a suitable length is configured by appropriately grouping the mobile stations in sleep or idle modes. The early notification information may be delivered to the mobile stations in sleep or idle mode via a downlink frame.

The early notification information may be delivered in a broadcast via the downlink frame. If the length of the early notification information is excessive, radio resources may be wasted. Therefore, configuring early notification information having a suitable length is provided. To configure early notification information having a suitable length, a 48-bit MAC address allocated to each mobile station may be used as an indicator to identify mobile stations in sleep or idle mode, for example.

The number of groups used to classify mobile stations in sleep or idle mode may be expressed by 'N_Group', for example. In grouping the mobile stations, the respective MAC address of the mobile stations may be used for reference, regardless of whether the mobile stations is in sleep or idle mode. Consequently, a group index (e.g., Group_Index) of a group to which a certain mobile station in sleep or idle mode belongs may be determined using the below Formula 2.

Group_Index=(MAC address) modulo N_Group  [Formula 2]

In Formula 2, 'Group_Index' means a remainder resulting from dividing a MAC address of a corresponding mobile station by the number of groups N_Group. Hence, a value of Group_Index ranges between 0 and (N_Group−1).

For example, in a case where mobile stations in sleep or idle mode are classified into ten groups (e.g., N_Group=10), a mobile station having a MAC address of '102' belongs to a 2nd group by '10 modulo (102)'. After completion of the above grouping procedure, a base station may configure a flag for early notification of mobile stations belonging to each group. The length of the flag (e.g., a bit number) is equal to the number of groups. Thus, the length of flag may be determined by 'N_Group'.

If a mobile station that must decode a traffic indicating message or a paging advertising message is present among a plurality of mobile stations belonging to a certain group (e.g., if there exists mobile station(s) unable to maintain a sleep or idle mode), a base station may set a flag for the group to which the corresponding mobile station belongs to 'positive notification', for example. In such case, the positive notification may be expressed as '1'.

If no mobile stations belonging to a certain group need to decode a traffic indicating message or a paging advertising message, the base station may set a flag for the corresponding group to 'negative notification', for example. In this case, the negative notification may be expressed as '0'.

In a preferred embodiment of the present invention, it is assumed that five mobile stations are present having MAC addresses 1, 2, 3, 4 and 5, respectively, and that the mobile station having the MAC address 3 in the current frame is instructed to decode a traffic indicating message and a paging advertising message. If the five mobile stations are classified into two groups (i.e., N_Group=2), Group_Index of the mobile station having the MAC address 2 is set to 0, Group_Index of the mobile station having the MAC address 4 is set to 0, and each Group_Index of the mobile stations having the MAC addresses 1, 3 and 5, respectively, is set to 1, for example.

To deliver a positive notification to the mobile station having the MAC address 3, a base station sets a flag having a Group_Index of 1 among 2-bit flags to 'positive'. Therefore, the base station may set flags such as those shown in the below Table 16, for example.

TABLE 16

| Group Index | 0 | 1 |
|---|---|---|
| Notification | 0 (Negative) | 1 (Positive) |

The flags may be delivered to the five mobile stations in a broadcast. The mobile station having a Group_Index with a flag set to 'negative' does not decode the traffic indicating message or the paging message included in a corresponding downlink frame.

As explained in the above embodiment, mobile stations may avoid unnecessary decoding of the traffic indicating message and the paging message via an early notification flag. Nonetheless, mobile stations belonging to the group set to 'positive' still decode the traffic indicating message and the paging message.

Furthermore, to increase efficiency via the early notification flag, another preferred embodiment may be implemented. In the embodiment, a base station is assumed to know the total number of mobile stations in sleep or idle mode and the number of mobile stations needing to be set to 'positive' in a current frame. Thus, the base station may determine the number of groups (N_Group) based on the preceding numbers. By regrouping mobile stations having a Group_Index set to 'positive', the base station may improve accuracy of the early notification. Accordingly, the mobile stations having a Group_Index set to 'positive' are classified into N_Positive_Group groups. An identifier for identifying each of the N_Positive_Group groups may be defined as a Positive_Group_Index.

In the above embodiment, the mobile stations having Group_Index set to 'positive' are regrouped into N_Positive_Group=3 groups, the mobile station having the MAC address 1 belongs to the group of which Positive_Group_Index is 1, the mobile station having the MAC address 3 belongs to the group of which Positive_Group_Index is 0, and the mobile station having the MAC address 5 belongs to the group of which Positive_Group_Index is 2, based on Formula 2. Therefore, a final early notification flag may have a format such as that shown in the below Table 17.

TABLE 17

| Group_Index | 0 | 1 | |
|---|---|---|---|
| Notification | 0 (negative) | 1 (positive) | |
| Positive_Group_Index | 0 | 1 | 2 |
| Notification | 0 (negative) | 1 (positive) | 0 (negative) |

Consequently, if the base station transmits the early notification flag to the mobile stations in sleep or idle mode together with values of N_Group and N_Positive_Group, the mobile stations belonging to the group set to 'positive' decode the corresponding traffic indicating message and the paging message. However, the mobile stations belonging to the group set to 'negative' may minimize power consumption by not decoding the messages.

Figure 9:
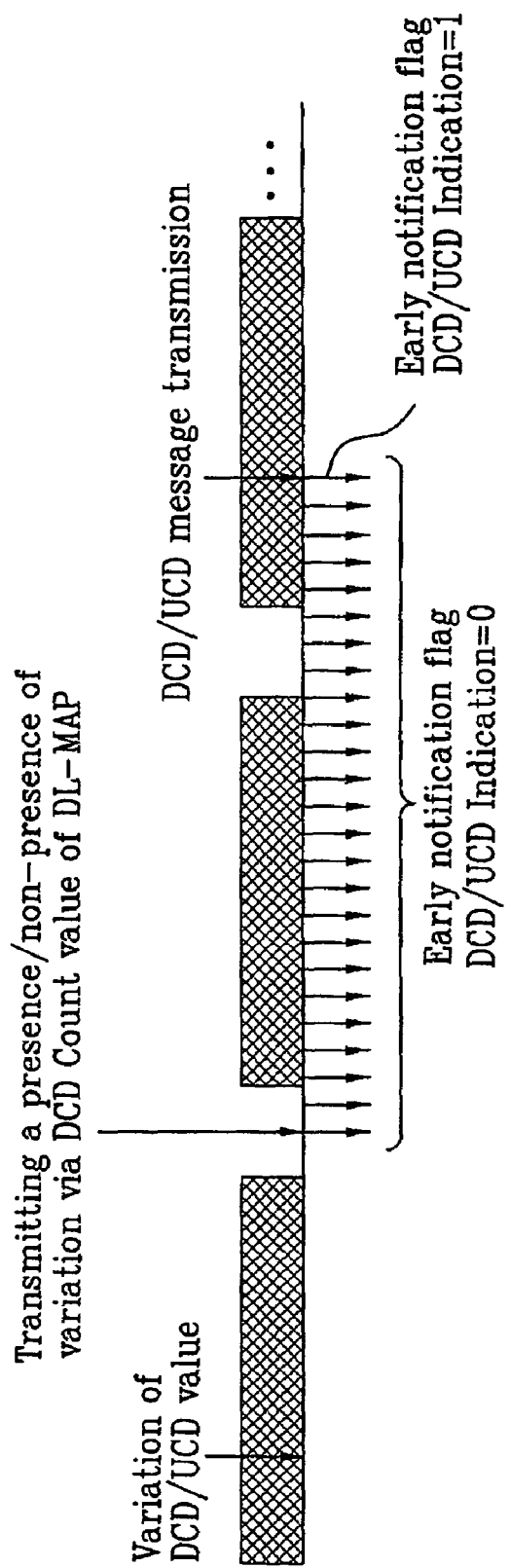
FIG. 9 is a diagram illustrating a mobile station in idle mode receiving a DCD/UCD message, according to another embodiment of the present invention.

FIG. 9 is a diagram illustrating a mobile station in idle mode receiving a DCD/UCD message, according to another embodiment of the present invention.

Referring to FIG. 9, the base station may transmit information indicating whether a DCD/UCD message is included in a current frame using an early notification flag. The information indicating whether the DCD/UCD message is included in the current frame may be transmitted using a DCD/UCD indicator (e.g., DCD/UCD Indication) of the early notification flag. Therefore, a mobile station may minimize power consumption by confirming the DCD/UCD Indication of the early notification flag and then decoding messages broadcast within a downlink frame having the corresponding value set to 1, for example.

Table 18 shows an exemplary early notification flag.

TABLE 18

| Syntax | Length (bits) | Notes |
|---|---|---|
| Early_Notification_Flag( ){ | | |
| Length | 8 | Length of the message in bytes |
| DCD/UCD Indication | 1 | 0: No DCD/UCD messages are included in the current DL frame<br>1: DCD/UCD messages are included in the current DL frame |
| N_Group | 8 | Number of groups for all MSs in Sleep Mode and Idle Mode |
| N_Positive_Group | 8 | Number of groups for all MSs that shall decode MOB-TRF-IND or MOB-PAG-ADV message |
| Early_Notification_Flag | variable | Length of the flag shall be equal to N_Group |
| Positive_Early_Notification_Flag | variable | Length of the flag shall be equal to N_Positive_Group |
| | variable | Padding for byte alignment. Shall be set to zero |
| } | | |

In a case where a mobile station in idle mode needs to receive a DCD/UCD message, the early notification flag may include information indicating whether the DCD/UCD message is transmitted in a current frame.

In order for a mobile station in idle mode to enter a network more quickly in case of uplink/downlink traffic occurrence, DCD/UCD variables of a base station within which the mobile station lies may be stored in the mobile station. Thus, the mobile station needs to receive the DCD/UCD message whenever the DCD/UCD variables are changed. The DCD/UCD variables may be changed if the mobile station lies within the same base station area and/or if the mobile station enters another base station area belonging to the same paging group.

Figure 8:
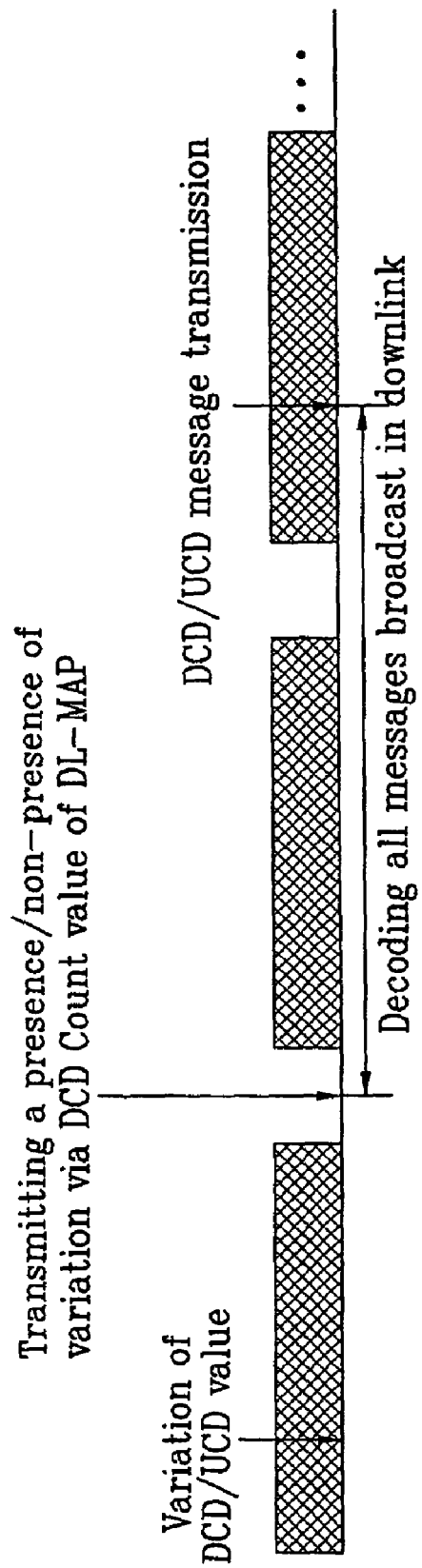
FIG. 8 is a diagram illustrating a mobile station in idle mode receiving a DCD/UCD message, according to an embodiment of the present invention.

FIG. 8 is a diagram illustrating a mobile station in idle mode receiving a DCD/UCD message, according to an embodiment of the present invention.

Referring to FIG. 8, DCD/UCD is transmitted by the same cycle of a variable called a DCD/UCD transmission cycle (e.g., DCD/UCD Interval). To know whether a DCD/UCD message is included in a current frame, a mobile station decodes a burst. Mobile stations in idle mode may determine whether the DCD/UCD is changed using a DCD count transmitted via a DL-MAP message but may not determine whether the received message relates to the DCD/UCD until decoding at least part of the burst. Thus, the mobile station in idle mode should decode all messages broadcast in a downlink frame until receiving the DCD/UCD message. Thus, significant power consumption may occur.

The early notification flag may be included as one information element (IE) included in the DL-MAP message or may be delivered in a separate broadcast message at the initiation of a downlink frame. Alternatively, the early notification flag may be delivered over a broadcast channel.

Figure 10:
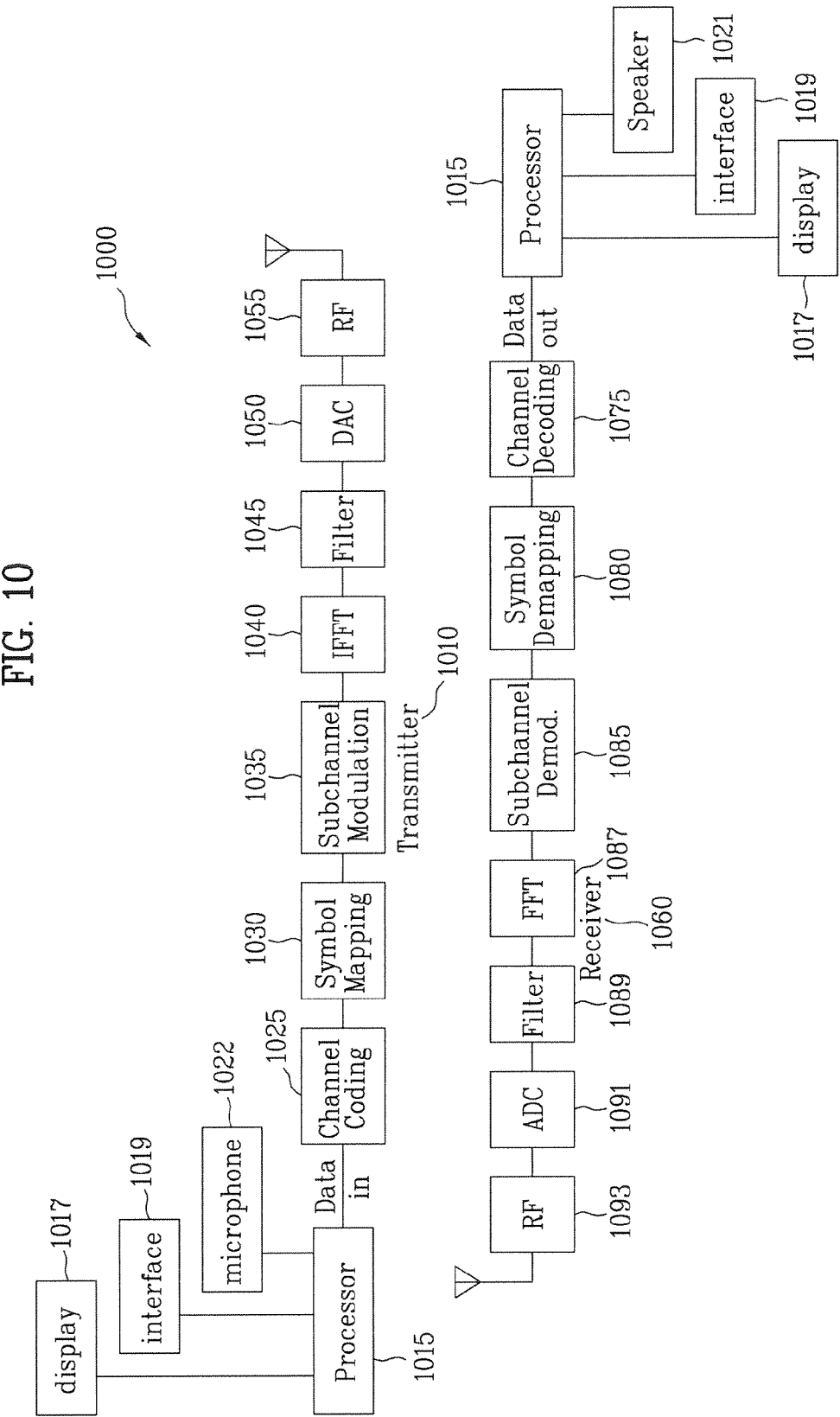
FIG. 10 is a generalized block diagram of a mobile station, according to an embodiment of the present invention.

FIG. 10 is a generalized block diagram of a mobile station 1000, according to an embodiment of the present invention. The methods described herein may be performed using the mobile station 1000, for example.

Referring to FIG. 10, the mobile station 1000 includes a transmitter 1010 and a receiver 1060, which operate in conjunction. A processor 1015, which performs control functions, may be shared by the transmitter 1010 and the receiver 1060. Alternatively, the transmitter 1010 and the receiver 1060 may have separate processors. A display 1017, an interface 1019, a speaker 1021, and a microphone 1022 are operatively coupled to the processor to enable operation of the mobile station 1000 by the user. A channel coding and a channel decoding 1025 and 1075, respectively, are operatively coupled to the processor to add redundancy bits, for example, and perform error correction. A symbol mapping and a symbol demapping 1030 and 1080, respectively, are operatively coupled to the channel coding and the channel decoding 1025 and 1075, respectively, and serve to map bits to signals, such as QPSK and 16QAM, for example. A subchannel modulation and a subchannel demodulation 1035 and 1085, respectively, are operatively coupled to the symbol mapping and the symbol demapping 1030 and 1080, respectively, and serve to map signals to OFDMA subcarriers. An IFFT (inverse fast fourier transform) and an FFT (fast fourier transform) 1040 and 1087, respectively, are operatively coupled to the subchannel modulation and the subchannel demodulation 1035 and 1085, respectively, and serve to generate an OFDM wave-formed signal by combining multiple subcarriers. The mobile station 1000 also includes filters 1045 and 1089, a digital to analog converter (DAC) 1050, an analog to digital converter (ADC) 1091, and radio frequency converters (RFs) 1055 and 1093.

In one embodiment, a method for controlling an idle mode in a mobile station comprises transmitting an idle mode request to a serving base station to enter the idle mode, and receiving a decode information transmission frame value and a decode information change status from at least one base station. The method also comprises, if the decode information change status indicates a change in the decode information, maintaining the idle mode, and receiving the decode information from the at least one base station when the transmission frame value is reached.

The decode information may comprise at least one of downlink channel descriptor (DCD) information and uplink channel descriptor (UCD) information. The decode information may comprise forward error correction (FEC) code type information. The transmission frame value may comprise a frame number. The transmission frame value may comprise a frame offset. The at least one base station may be in a same paging group. The method may further comprise maintaining the idle mode if the decode information change status indicates no change in the decode information.

In another embodiment, a method in a network for controlling an idle mode in a mobile station comprises receiving an idle mode request from a mobile station to enter the idle mode, and transmitting a decode information transmission frame value and a decode information change status to the mobile station. If the decode information change status indicates a change in the decode information, the mobile station maintains the idle mode. The method also comprises transmitting the decode information to the mobile station when the transmission frame value is reached.

The network may comprise at least one base station and a paging controller, the paging controller configured to control paging within base stations of a paging group. The decode information transmission frame value and the decode information change status may be broadcast to the mobile station at each paging interval.

Accordingly, the present invention provides early notification of channel descriptor information from a base station to a mobile station to reduce decoding by the mobile station. Power consumption may thus be reduced and communications may be performed more efficiently.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for controlling an idle mode in a mobile station, the method comprising:
   receiving, by a mobile station, a first channel descriptor message including a configuration change count;
   maintaining, by the mobile station, the configuration change count;
   receiving, by the mobile station, a map message comprising a channel descriptor count and an information element including a channel descriptor indication field, wherein the channel descriptor indication field indicates a frame where a second channel descriptor message is transmitted; and
   if the channel descriptor count is different from the configuration change count maintained by the mobile station,
   decoding, by the mobile station, the frame to receive the second channel descriptor message indicated by the channel descriptor indication field, even if the mobile station is scheduled to be in a paging unavailable interval of the idle mode,
   wherein the first channel descriptor message and second channel descriptor message comprise forward error correction (FEC) code type information.

2. The method of claim 1, wherein the channel descriptor indication field comprises a frame number.

3. The method of claim 1, wherein the channel descriptor indication field comprises a frame offset.

4. The method of claim 1, further comprising:
   maintaining an idle mode in the mobile station if the channel descriptor count is not different from the configuration change count maintained by the mobile station.

5. A method in a network for controlling an idle mode in a mobile station, the method comprising:
   transmitting, by the network, a first channel descriptor message including a configuration change count to a mobile station, wherein the mobile station maintains the configuration change count; transmitting, by the network to the mobile station, a map message comprising a channel descriptor count and an information element including a channel descriptor indication field, wherein the channel descriptor indication field indicates a frame where a second channel descriptor message is transmitted,
   if the channel descriptor count is different from the configuration change count maintained by the mobile station,
   transmitting, by the network to the mobile station, a second channel descriptor message, even if the mobile station is scheduled to be in a paging unavailable interval of the idle mode,
   wherein the first channel descriptor message and second channel descriptor message comprise forward error correction (FEC) code type information.

6. The method of claim 5, wherein the network comprises at least one base station and a paging controller, the paging controller configured to control paging within base stations of a paging group.

7. The method of claim 5, wherein the map message and the information element are broadcast to the mobile station at each paging interval.

8. A mobile station for controlling an idle mode in a wireless access system, the mobile station comprising:
   means for receiving a first channel descriptor message including a configuration change count;
   means for maintaining the configuration change count;
   means for receiving a map message comprising a channel descriptor count and an information element including a channel descriptor indication field, wherein the channel descriptor indication field indicates a frame where a second channel descriptor message is transmitted; and
   means for decoding the frame to receive the second channel descriptor message indicated by the channel descriptor indication field even if the mobile station is scheduled to be in a paging unavailable interval of the idle mode if the channel descriptor count is different from the configuration change count maintained by the mobile station, wherein the first channel descriptor message and second channel descriptor message comprise forward error correction (FEC) code type information.

9. The mobile station of claim 8, wherein the channel descriptor indication field comprises a frame number.

10. The mobile station of claim 8, wherein the channel descriptor indication field comprises a frame offset.

11. The mobile station of claim 8, further comprising:
means for maintaining an idle mode if the channel descriptor count is not different from the configuration change count maintained by the mobile station.

12. A network for controlling an idle mode in a mobile station, the network comprising:
means for transmitting a first channel descriptor message including a configuration change count to a mobile station, wherein the mobile station maintains the configuration change count;
means for transmitting to the mobile station a map message comprising a channel descriptor count and an information element including a channel descriptor indication field, wherein the channel descriptor indication field indicates a frame where a second channel descriptor message is transmitted; and
means for transmitting a second channel descriptor message even if the mobile station is scheduled to be in a paging unavailable interval of the idle mode, if the channel descriptor count is different from the configuration change count maintained by the mobile station,
wherein the first channel descriptor message and second channel descriptor message comprise forward error correction (FEC) code type information.

13. The network of claim 12, wherein the network comprises at least one base station and a paging controller, the paging controller configured to control paging within base stations of a paging group.

14. The network of claim 12, wherein the map message and the information element are broadcast to the mobile station at each paging interval.

* * * * *